US009094146B2

(12) United States Patent
Lindoff et al.

(10) Patent No.: US 9,094,146 B2
(45) Date of Patent: Jul. 28, 2015

(54) SECONDARY SYNCHRONIZATION SEQUENCES FOR CELL GROUP DETECTION IN A CELLULAR COMMUNICATIONS SYSTEM

(75) Inventors: Bengt Lindoff, Bjärred (SE); Robert Baldemair, Solna (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 207 days.

(21) Appl. No.: 13/159,017

(22) Filed: Jun. 13, 2011

(65) Prior Publication Data

US 2011/0243122 A1 Oct. 6, 2011

Related U.S. Application Data

(63) Continuation of application No. 12/522,166, filed on Dec. 7, 2007, now Pat. No. 7,961,709.

(60) Provisional application No. 60/883,898, filed on Jan. 8, 2007.

(51) Int. Cl.
*H04J 11/00* (2006.01)
*H04W 28/18* (2009.01)
*H04W 48/08* (2009.01)

(52) U.S. Cl.
CPC ......... *H04J 11/0076* (2013.01); *H04J 11/0069* (2013.01); *H04J 11/0073* (2013.01); *H04W 28/18* (2013.01); *H04W 48/08* (2013.01)

(58) Field of Classification Search
CPC .................................................... H04J 11/0076
USPC ......... 370/203–210, 304, 324, 335, 337, 342, 370/350, 395.62, 503–514, 520; 455/13.2, 455/67.16, 208–209, 255, 265, 501, 502, 455/517, 524, 525; 375/145, 149, 356, 375/365–368
See application file for complete search history.

(56) References Cited

U.S. PATENT DOCUMENTS 5,930,366 A 7/1999 Jamal et al.
6,785,513 B1 8/2004 Sivaprakasam (Continued)

OTHER PUBLICATIONS

Ericsson "S-SCH Sequence Design." 3GPP TSG-RAN Wg 1 Meeting #48. Feb. 12-16, 2007. R1-071027. St. Louis, US.

(Continued)

*Primary Examiner* — Habte Mered

(57) ABSTRACT

Timing parameters and an identity of a particular one of a number of cell groups are indicated in a signal transmitted in a cellular communication system having a radio frame in a physical layer, the radio frame comprising a number of time slots. In a known one of the time slots, a synchronization signal, $S_1$, is transmitted that comprises a pair of sequences, $S_i^{\%}, S_j^{\%}$ ($S_i^{\%} \neq S_j^{\%}$ arranged in a first ordering. In another known one of the time slots, a synchronization signal, $S_2$ is transmitted that comprises the pair of sequences, $S_i^{\%}, S_j^{\%}$ arranged in a second ordering. The selected pair of sequences is uniquely identified with the particular cell group, and the first ordering of the sequences is used only for transmission in the known one of the time slots, and the second ordering of the sequences is used only for transmission in said another known one of the time slots.

57 Claims, 6 Drawing Sheets

(56) References Cited

U.S. PATENT DOCUMENTS

| | | | | |
|---|---|---|---|---|
| 6,826,244 | B2 | 11/2004 | Demir et al. | |
| 8,279,909 | B2 * | 10/2012 | Noh et al. | 375/146 |
| 8,472,423 | B2 * | 6/2013 | Ma et al. | 370/342 |
| 8,503,485 | B2 * | 8/2013 | Malladi et al. | 370/503 |
| 2006/0133431 | A1 | 6/2006 | Payne et al. | |
| 2007/0183391 | A1 * | 8/2007 | Akita et al. | 370/350 |
| 2009/0323629 | A1 | 12/2009 | Lindoff et al. | |
| 2010/0182979 | A1 * | 7/2010 | Malladi et al. | 370/336 |

OTHER PUBLICATIONS

NTT DoCoMo, NEC, Sharp SCH Structure and Cell Search Method in E-UTRA Downlink. 3GPP TSG-RAN WG1 LTE Ad Hoc Meeting. Jan. 23-25, 2006. R1-060042. Helsinki, Finland.
ETRI "Comparison of One-SCH and Two-SCH schemes for EUTRA Cell Search." 3GPP TSG RAN WG1 Meeting #45. May 8-12, 2006. R1-061117. Shanghai, China.
Huawei "Hierarchical SCH Signals Suitable for Both (FDD and TDD) Modes of E-UTRA." 3GPP TSG RAN WG1 #46bis. Oct. 9-13, 2006. R1-062487. Seoul, South Korea.
Motorola "Placement of P-SCH and S-SCH." 3GPP TSG RAN WG1 Meeting #47. Nov. 6-10, 2006. R1-063049. Riga, Latvia.
Original Complaint, *Ericsson Inc.* v. *Samsung Electronics Co., Ltd.*, Civil Action No. 6: 12-cv-895 (E.D. Tex. filed Nov. 27, 2012).
Samsung's Answer, Affirmative Defenses, and Counterclaims to Ericsson's Original Complaint, *Ericsson Inc.* v. *Samsung Electronics Co., Ltd.*, Civil Action No. 6: 12-cv-895 (E.D. Tex. filed Mar. 18, 2013).
Ericsson's Answer, Affirmative Defenses and Counterclaims to Samsung's Answer, Affirmative Defenses and Counterclaims, *Ericsson Inc.* v. *Samsung Electronics Co., Ltd.*, Civil Action No. 6:12-cv895 (E.D. Tex. filed Apr. 12, 2013).
Defendant Samsung's Answer and Affirmative Defenses to Ericsson's Counterclaims, *Ericsson Inc.* v. *Samsung Electronics Co., Ltd.*, Civil Action No. 6:12-cv-895 (E.D. Tex. filed May 9, 2013).
Defendants' Invalidity Contentions, *Ericsson Inc.* v. *Samsung Electronics Co., Ltd.*, Civil Action No. 6:12-cv-895 (E.D. Tex. served Nov. 29, 2013).
Nortel, R1-072757, "Further Discussion on the Mapping of Short Sequences for S-SCH," 3GPP TSG RAN WG1 Meeting #49 bis, Jun. 25, 2007.
Motorola, R1-074022, "Cell Search E-mail Reflector Summary," 3GPP TSG RAN WG1 Meeting #50-bis, Oct. 8, 2007.
Huawei, R1-073514, "Scrambling and information encoding for the S-SCH," 3GPP TSG RAN WG1 Meeting #50, Aug. 20, 2007.
Ericsson, R1-071027, "S-SCH sequence design" 3GPP TSG RAN WG1 Meeting #48, Feb. 12, 2007.
Nokia, et al., R1-062990, "Outcome of cell search drafting session," 3GPP TSG RAN WG1 Meeting #46bis, Oct. 9, 2006.
Fujitsu, R1-063342, "Views on SCH structure," 3GPP TSG RAN WG1 Meeting #47, Nov. 6, 2006.
NTT DoCoMo, et al., R1-062093, "SCH Sequence Configuration for E-UTRA Downlink," 3GPP TSG RAN WG1 Meeting #46, Aug. 28, 2006.
InterDigital Communication Corp., R1-062495, "Cell Search Proposal for E-UTRA," 3GPP TSG RAN WG1 Meeting #46bis, Oct. 9, 2006.
Tanno, Motohiro et al, "Experiments on Three-Step Fast Cell Search Algorithm Employing Common Pilot Channel for OFCDM Broadband Packet Wireless Access in Forward Link," IEEE 60th Vehicular Technology Conference, Sep. 26, 2004.
Exhibit 709-A01 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-A02 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-A03 to Defendants' Invalidity Contentions, *Ericsson Inc.* v. *Samsung Electronics Co.; Ltd.*, Civil Action No. 6:12-cv-895 (E.D. Tex. served Nov. 29, 2013).
Exhibit 709-A04 to Defendants' Invalidity Contentions, *Ericsson Inc.* v. *Samsung Electronics Co.; Ltd.*, Civil Action No. 6:12-cv-895 (E.D. Tex. served Nov. 29, 2013).
Exhibit 709-A05 to Defendants' Invalidity Contentions, *Ericsson Inc.* v. *Samsung Electronics Co.; Ltd.*, Civil Action No. 6:12-cv-895 (E.D. Tex. served Nov. 29, 2013).
Exhibit 709-A06 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B01 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B02 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B03 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B04 to Defendants' Invalidity Contentions, *Ericsson Inc.* v. *Samsung Electronics Co.; Ltd.*, Civil Action No. 6:12-cv-895 (E.D. Tex. served Nov. 29, 2013).
Exhibit 709-B05 to Defendants' Invalidity Contentions, *Ericsson Inc.* v. *Samsung Electronics Co.; Ltd.*, Civil Action No. 6:12-cv-895 (E.D. Tex. served Nov. 29, 2013).
Exhibit 709-B06 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B07 to Defendants' Invalidity Contentions, *Ericsson Inc.* v. *Samsung Electronics Co., Ltd.*, Civil Action No. 6:12-cv-895 (E.D. Tex. served Nov. 29, 2013.
Exhibit 709-B08 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B09 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B10 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B11 to Defendants' Invalidity Contentions, *Ericsson Inc.* v. *Samsung Electronics Co., Ltd.*, Civil Action No. 6:12-cv-895 (E.D. Tex. served Nov. 29, 2013).
Exhibit 709-B12 to Defendants' Invalidity Contentions, *Ericsson Inc.* v. *Samsung Electronics Co., Ltd.*, Civil Action No. 6:12-cv-895 (E.D. Tex. served Nov. 29, 2013).
ETRI, R1-060823, "Cell Search Scheme for EUTRA," 3GPP RAN WG1 #44 bis Meeting, Athens, Greece, Mar. 27-31, 2006.
3GPP RAN1 document R1-075112, "Introduction of scrambling sequences, uplink reference signal sequences, secondary synchronization sequences and control channel processing," Editor of TS36.211 (Ericsson), 3GPP TSG RAN#51, Nov. 5-9, 2007.

* cited by examiner

SECONDARY SYNCHRONIZATION SEQUENCES FOR CELL GROUP DETECTION IN A CELLULAR COMMUNICATIONS SYSTEM

CROSS REFERENCE TO RELATED APPLICATIONS

This application is a continuation application which claims the benefit of U.S. patent application Ser. No. 12/522,166 filed on Dec. 7, 2007 now U.S. Pat. No. 7,961,709, which claims the benefit of U.S. Provisional Application No. 60/883,898 filed on Jan. 8, 2007, which claims the benefit of PCT Application Number PCT/EP2007/063493 filed on Dec. 7, 2007 the disclosure of which is fully incorporated herein by reference.

BACKGROUND

The present invention relates to methods and apparatuses for identifying cells in a cellular communication system.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

The physical layer of a 3G LTE system includes a generic radio frame having a duration of 10 ms. FIG. 1 illustrates one such frame 100. Each frame has 20 slots (numbered 0 through 19), each slot having a duration of 0.5 ms. A sub-frame is made up of two adjacent slots, and therefore has a duration of 1 ms.

One important aspect of LTE is the mobility function. Hence, synchronization symbols and cell search procedures are of major importance in order for the User Equipment (UE) to detect and synchronize with other cells. To facilitate cell search and synchronization procedures, defined signals include primary and secondary synchronization signals (P-SyS and S-SyS, respectively), which are transmitted on a Primary Synchronization Channel (P-SCH) and a Secondary Synchronization Channel (S-SCH), respectively. The P-SySs and S-SySs are each broadcast twice per frame: once in sub-frame 0, and again in sub-frame 5, as shown in FIG. 1.

The currently proposed cell search scheme for LTE is as follows:

1. Detect one out of three possible P-SyS symbols, thereby indicating the 5 ms timing and the cell ID within a currently unknown cell group.

2. Detect frame timing and cell group using the S-SyS. This in combination with the results from step 1 gives an indication of the full cell ID.

3. Use the reference symbols (also called CQI pilots) to detect the cell ID. The interested reader is referred to the document R1-062990, entitled "Outcome of cell search drafting session", TSG-RAN WG1 #46bis, Oct. 9-13, 2006 for more information about this proposal.

4. Read the Broadcast Channel (BCH) to receive cell-specific system information.

The SyS signals transmitted on the S-SCH are constructed as a pair of sequences, S1, S2 (see FIG. 1). The sequences are defined in the frequency domain. The signals to be transmitted on the S-SCH should be constructed such that the SyS pair S1, S2 should uniquely define the cell group and 10 ms frame timing once detected by the UE such that the cell group pn-sequence is detected and the UE can start the verification step (stage 3) of the above-described process (i.e., verification of the cell ID detected from stage 1 and stage 2 processing).

Furthermore, in order to minimize interruption time when performing Inter-frequency and Inter-Radio Access Technology (InterRAT) measurements, it is desirable that it also be possible to detect the cell group using only one SyS (i.e., S1 or S2 alone).

Consequently, there is a need for an S-SyS sequence design that will satisfy both requirements.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in a methods and apparatuses that indicate timing parameters and an identity of a particular cell group from a number, M, of possible cell groups in a signal transmitted in a cellular communication system that employs a radio frame in a physical layer, the radio frame comprising a number of time slots. Indicating these parameters involves transmitting, in a known one of the time slots of the radio frame, a synchronization signal, $S_1$, that comprises a pair of sequences, $S_i^{\%}, S_j^{\%}$ arranged in a first ordering; and transmitting, in another known one of the time slots of the radio frame, a synchronization signal, $S_2$ that comprises the pair of sequences, $S_i^{\%}, S_j^{\%}$ arranged in a second ordering, wherein:

each member of the pair of sequences, $S_i^{\%}, S_j^{\%}$, is selected from a group comprising at least $$N_{Seq} = \mathrm{ceil}\left(\frac{1+\sqrt{1+8M}}{2}\right)$$

different sequences; and the selected pair of sequences is uniquely identified with the particular cell group, wherein i, j∈[1, . . . , $N_{Seq}$] and $S_i^{\%} \neq S_j^{\%}$.

The first ordering of the sequences is used only for transmission in the known one of the time slots of the radio frame, and the second ordering of the sequences is used only for transmission in said another known one of the time slots. Consequently, detection of the ordering of just one pair of sequences can be used by a receiver as a time slot identifier, which in turn allows radio frame timing to be determined.

In some embodiments, the first ordering of the pair of sequences, $S_i^{\%}, S_j^{\%}$ is effected by transmitting the sequence $S_i^{\%}$ before transmitting the sequence $S_j^{\%}$; and the second ordering of the pair of sequences, $S_i^{\%}$,$S_j^{\%}$ is effected by transmitting the sequence $S_j^{\%}$ before transmitting the sequence $S_i^{\%}$. In such cases, $S_1$ and $S_2$ can each be of length n, and each of the sequences $S_i^{\%}$,$S_j^{\%}$ can be of length n/2.

In alternative embodiments, in which the physical layer of the cellular communication system employs Orthogonal Frequency Division Multiplexing, the first ordering of the pair of sequences, $S_i^{\%}$,$S_j^{\%}$ is effected by transmitting the sequence $S_i^{\%}$ on a first set of one or more sub-carriers, and transmitting the sequence $S_j^{\%}$ on a second set of one or more sub-carriers. Conversely, the second ordering of the pair of sequences, $S_i^{\%}$,$S_j^{\%}$ is effected by transmitting the sequence $S_j^{\%}$ on the first set of one or more sub-carriers, and transmitting the sequence $S_i^{\%}$ on the second set of one or more sub-carriers.

In yet other alternative embodiments, ordering of the pair of sequences can be effected by generating the synchronization signals $S_1$ and $S_2$ in accordance with:

$$S_1=\alpha S_i^{\%}+\beta S_j^{\%}; \text{ and}$$

$$S_2=\beta S_i^{\%}+\alpha S_j^{\%},$$

wherein:

α is a first multiplicand;

β is a second multiplicand, $\alpha\neq\beta$.

Each of the multiplicands, α and β, can for example be a scalar value and correspond to an amount of signal amplitude. Alternatively, each of the multiplicands, α and β, can correspond to an amount of signal power.

In some such embodiments, the synchronization signals $S_1$ and $S_2$ and the sequences $S_i^{\%}$ and $S_j^{\%}$ can all be of equal length.

In some variants of such embodiments, transmitting the synchronization signal $S_1$ comprises transmitting $\alpha S_i^{\%}$ and $\beta S_j^{\%}$ simultaneously; and transmitting the synchronization signal $S_2$ comprises transmitting $\beta S_i^{\%}$ and $\alpha S_j^{\%}$ simultaneously.

Various aspects of the invention are also reflected on the receiver side of the communication system, in which methods and apparatuses are provided that detect timing parameters and an identity of a particular cell group from a number, M, of possible cell groups in a signal received in a cellular communication system that employs a radio frame in a physical layer, the radio frame comprising a number of time slots including two time slots associated with a synchronization channel. Such detection includes receiving, in one of the time slots associated with the synchronization channel, one of first and second synchronization signals, $S_1$ and $S_2$, wherein the first synchronization signal $S_1$ comprises a pair of sequences, $S_i^{\%}$, $S_j^{\%}$ arranged in a first ordering and the second synchronization signal $S_2$ comprises the pair of sequences, $S_i^{\%}$,$S_j^{\%}$ arranged in a second ordering. It is then determined which of a number of predefined sequences best matches the received sequence $S_i^{\%}$, which of the number of predefined sequences best matches the received sequence $S_j^{\%}$, and whether the pair of received sequences $S_i^{\%}$,$S_j^{\%}$ were arranged in the first ordering or the second ordering, wherein the number of predefined sequences is selected from a group comprising at least $$N_{Seq}=\text{ceil}\left(\frac{1+\sqrt{1+8M}}{2}\right)$$

different sequences.

The particular cell group is identified by performing a cell group identification process that includes determining with which cell group the pair of received sequences, $S_i^{\%}$,$S_j^{\%}$, is uniquely associated. It is also determined in which one of the two time slots associated with the synchronization channel the one of first and second synchronization signals was received by using information that indicates whether the sequences $S_i^{\%}$,$S_j^{\%}$ were received in the first ordering or the second ordering.

In yet another aspect, identifying the particular cell group by determining with which cell group the pair of received sequences, $S_i^{\%}$,$S_j^{\%}$ is uniquely associated comprises using the pair of received sequences $S_i^{\%}$,$S_j^{\%}$ to locate an entry in a look-up table.

In still another aspect, using information about whether the sequences $S_i^{\%}$,$S_j^{\%}$ were arranged in the first ordering or the second ordering to determine in which one of the two time slots associated with the synchronization channel the received one of the first and second synchronization signals was received comprises using the pair of received sequences $S_i^{\%}$,$S_j^{\%}$ to locate an entry in a look-up table.

In another aspect, whether to rely on just one or both of the received synchronization signals can be made dependent on the type of cell search being performed. For example, such embodiments can include receiving, in an other one of the time slots associated with the synchronization channel, an other one of the first and second synchronization signals. It is then determined whether a type of cell search procedure to be performed is an inter-frequency cell search procedure, an inter-radio access technology cell search procedure, or an intra-cell search procedure. If the type of cell search procedure to be performed is none of these, then it is determined which of the number of predefined sequences best matches the received sequence $S_i^{\%}$ of the other one of the first and second synchronization signals, which of the number of predefined sequences best matches the received sequence $S_j^{\%}$ of the other one of the first and second synchronization signals, and whether the pair of received sequences $S_i^{\%}$,$S_j^{\%}$ of the other one of the first and second synchronization signals were arranged in the first ordering or the second ordering. In such cases, the cell group identification process further includes determining with which cell group the pair of received sequences, $S_i^{\%}$,$S_j^{\%}$, of the other one of the first and second synchronization signals is uniquely associated.

BRIEF DESCRIPTION OF THE DRAWINGS

The objects and advantages of the invention will be understood by reading the following detailed description in conjunction with the drawings in which:

FIGS. 2(*b*) and 2(*c*) show alternative arrangements in the frequency domain of sub-sequences that make up each of the SyS sequences S1 and S2 in accordance with an aspect of alternative embodiments consistent with the invention.

DETAILED DESCRIPTION

Figure 1:
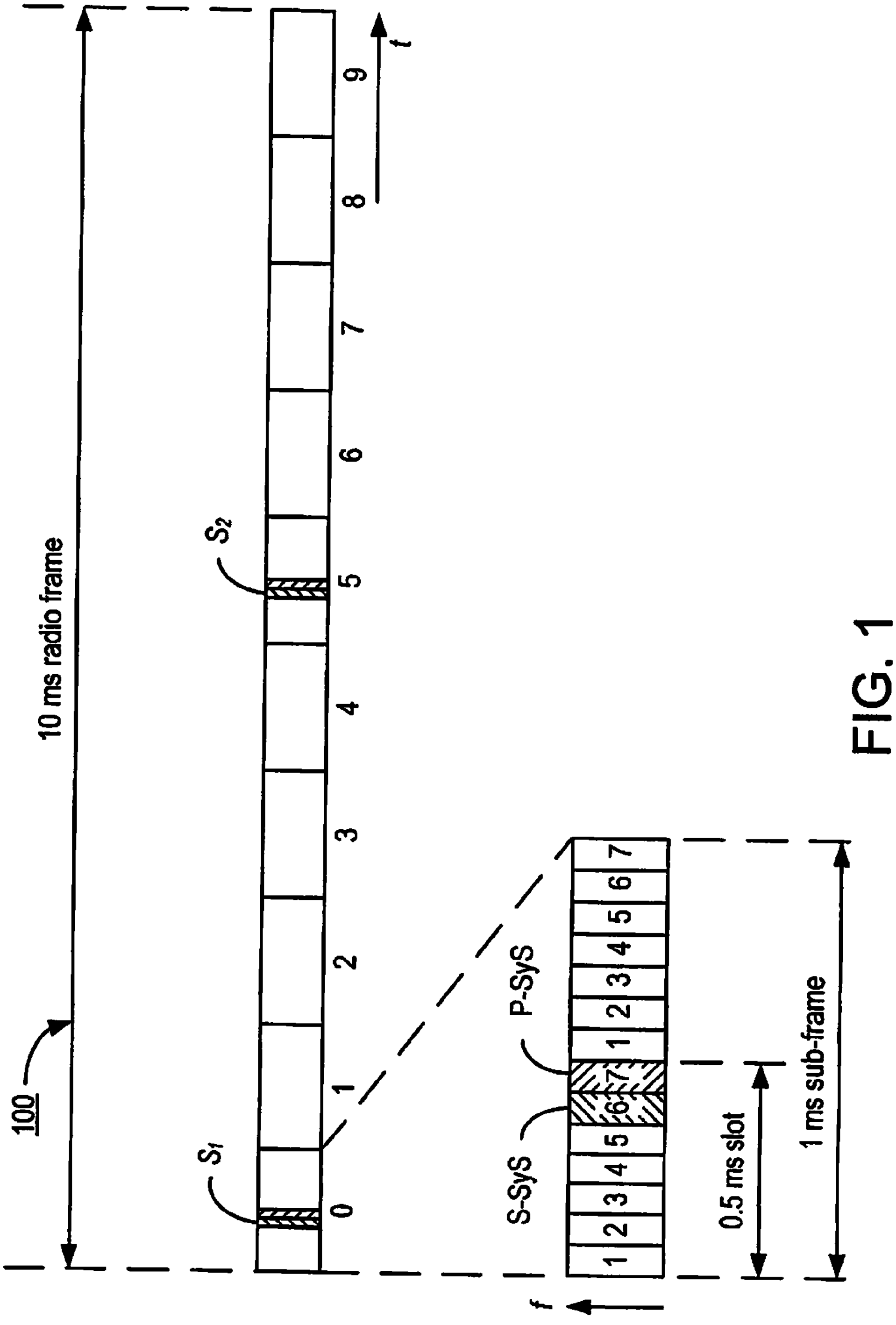
FIG. 1 is an exemplary radio frame suitable for communications systems like the 3G LTE system.
Figure 2A:
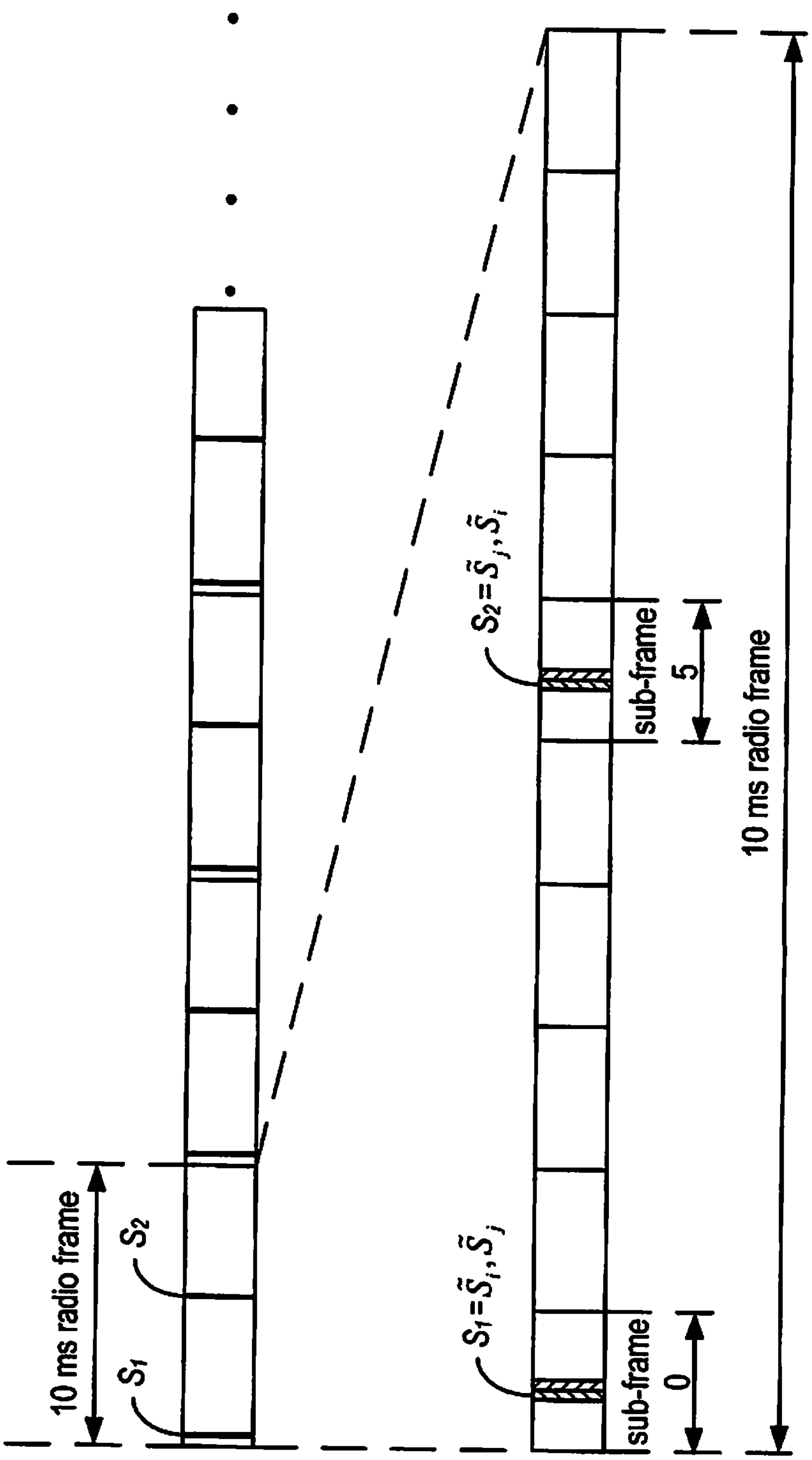
FIGS. 2(*a*) and 2(*d*) illustrate a number of exemplary alternative ways of constructing the symbols $S_i$ ($1\leq i\leq 2$) from sequences $S_i^{\%}$,$S_j^{\%}$ in accordance with an aspect of embodiments consistent with the invention.
Figure 2B:
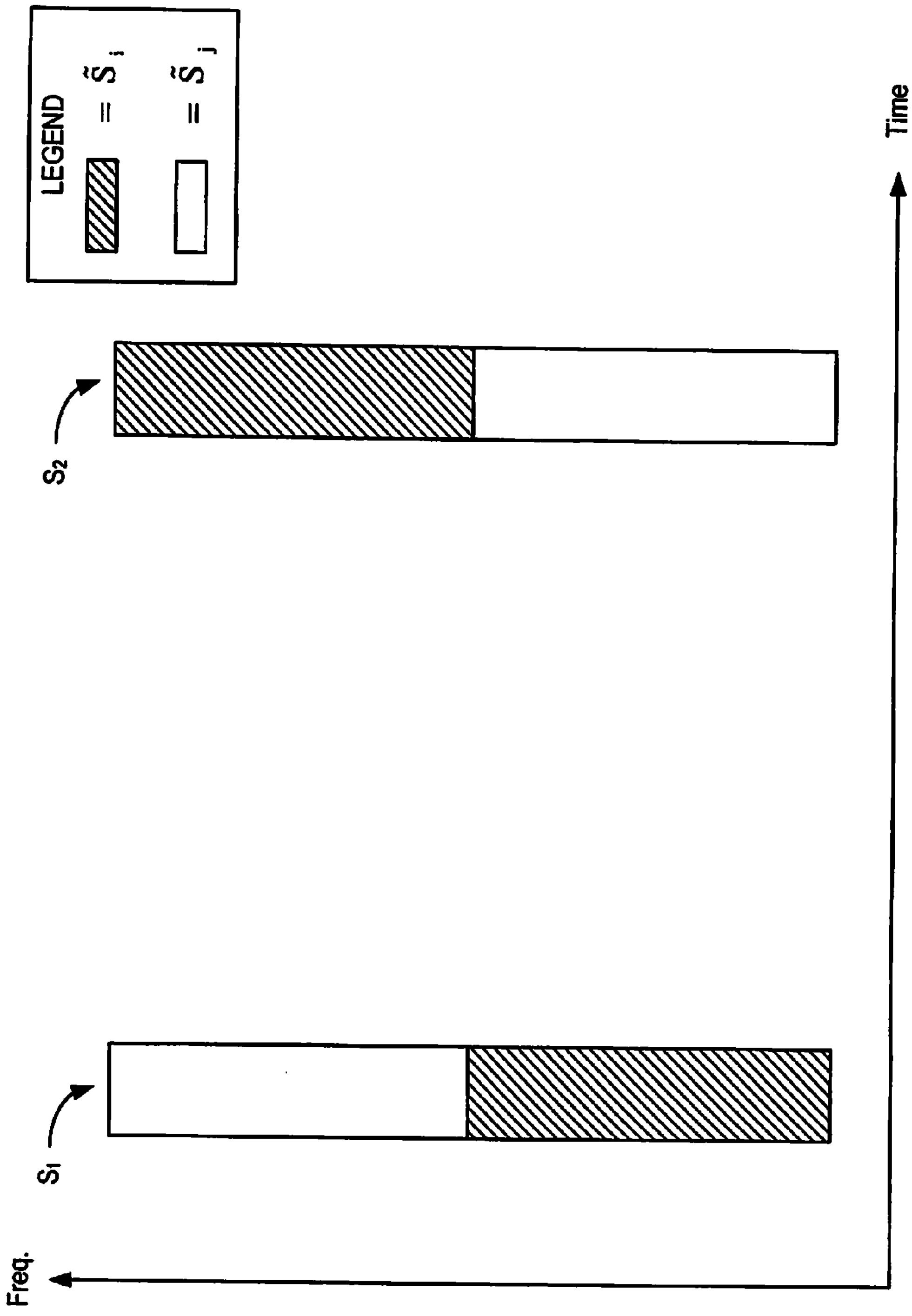
Figure 2C:
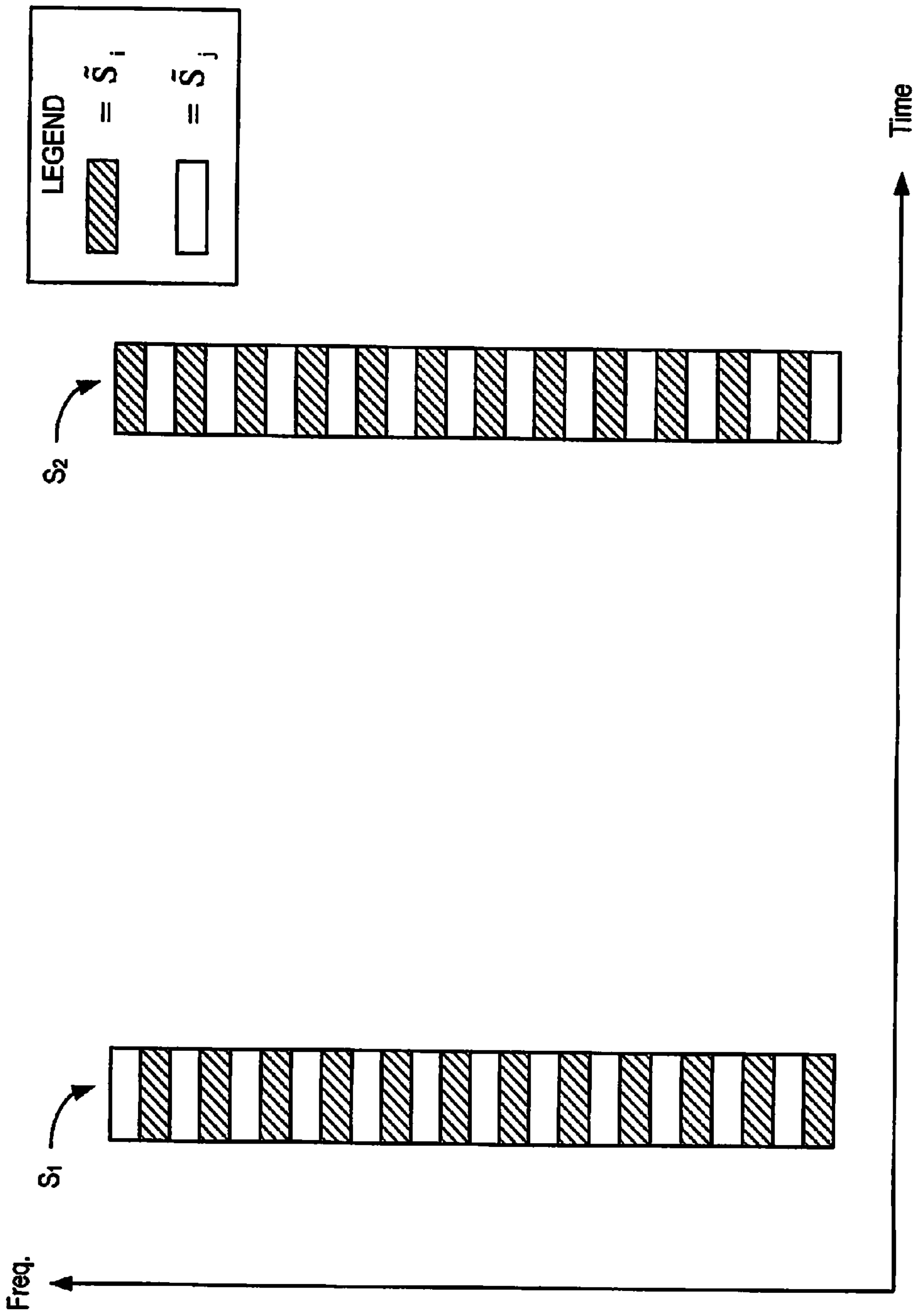
Figure 2D:
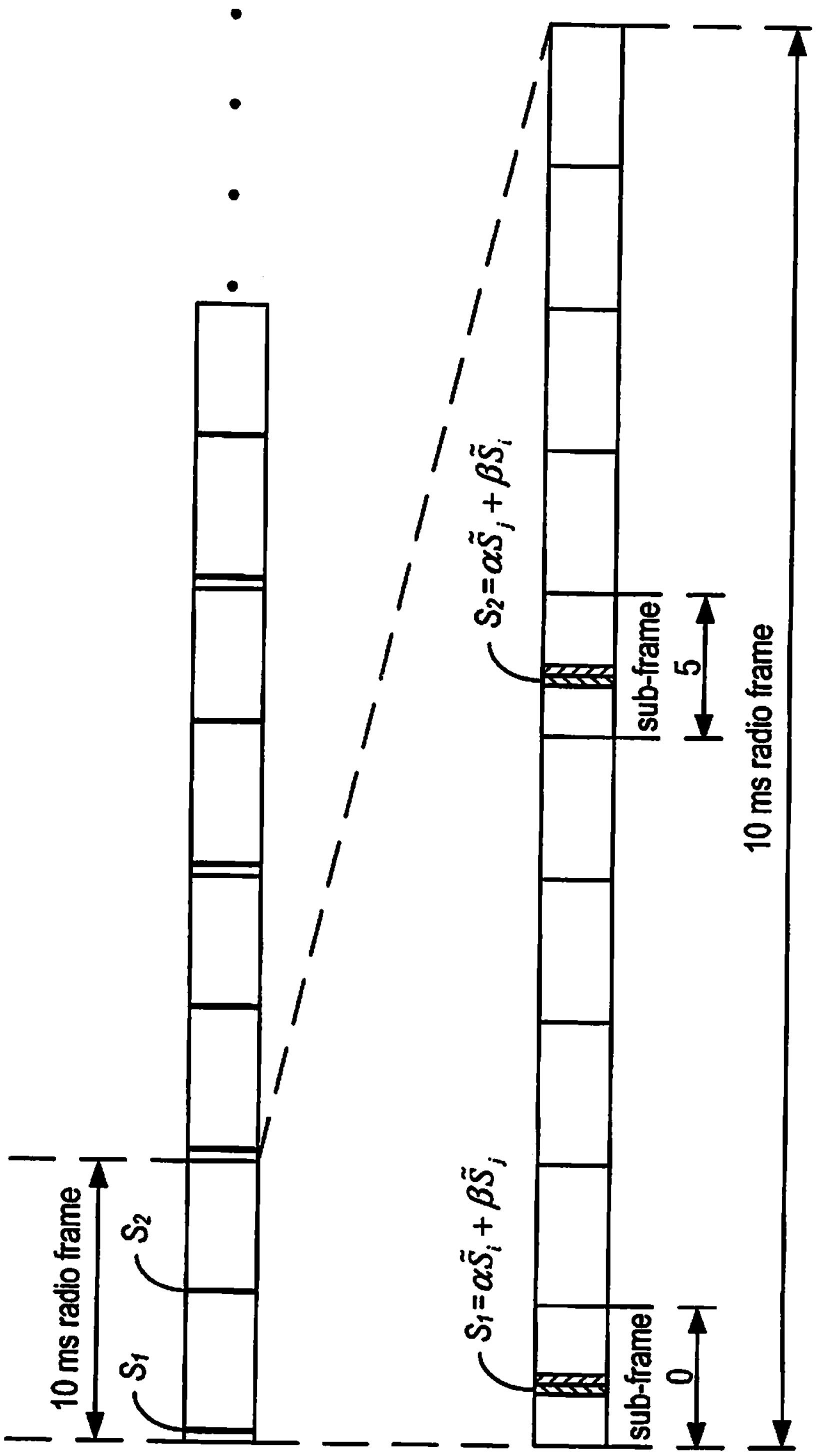

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of embodiments consistent with the invention is the provision of a minimum amount of S-SyS sequences needed to satisfy the requirement that the pair [$S_1$, $S_2$] uniquely defines the cell group and frame timing, and at the same time also makes it possible to detect the cell group using only one S-SyS (i.e., only one member of the pair [$S_1$, $S_2$]).

Another aspect is the provision of methods and apparatuses that utilize the above-mentioned S-SyS sequences for cell group detection.

To facilitate a better understanding of the various aspects of the invention, the following description assumes an exemplary stage 2 process in the LTE cell search procedure; that is, cell group detection. However, the invention is not limited to this exemplary embodiment, but rather is applicable to any comparable radio communications environment.

Furthermore, the sequences described below can be defined and detected in both the time and frequency domains, and the exact sequences utilized (e.g., Hadamard, pn, Zadoff-Chu, M-sequences, etc.) are not limited by the invention.

To begin the discussion, assume that M unique cell groups are needed and that each cell group is uniquely associated with a pair of sequences $S_i^{\%}, S_j^{\%}$. Furthermore, taking 3G LTE as a non-limiting example, assume that the S-SyS symbols that are transmitted at two locations per frame 100 (e.g., in subframes 0 and 5, the first transmission within the frame being labeled $S_1$ and the second transmission within the frame being labeled $S_2$) are each created as a function of these sequences. That is, $S_1=f_1(S_1^{\%},S_2^{\%})$ and $S_2=f_2(S_1^{\%},S_2^{\%})$. The detection of at least one of these sequences should also give information about where subframe 0 is placed. The lowest number of sequences that provides all of the above information can be determined as follows: Let $N_{seq}$ be the number of sequences needed to represent the M cell groups. The number of possible combinations of these sequences, taken two at a time, is given by the expression $N_{seq}\cdot(N_{seq}-1)\div 2$. The minimum value of $N_{seq}$ that will allow M cell groups to be represented can then be found in accordance with:

$$\frac{N_{Seq}\cdot(N_{Seq}-1)}{2}=M \qquad (1)$$

This leads to the following quadratic equation:

$$N_{Seq}^2-N_{Seq}-2M=0$$

Applying the well-known quadratic formula for finding the roots of a quadratic equation, one finds that the positive value of $N_{Seq}$ that satisfies the above requirements is given by:

$$N_{Seq}=\frac{1+\sqrt{1+8M}}{2} \qquad (3)$$

In practice, $N_{Seq}$ cannot be permitted to be a non-integer number, so the minimum acceptable integer value of $N_{seq}$ is given by $$N_{Seq}=\mathrm{ceil}\left(\frac{1+\sqrt{1+8M}}{2}\right), \qquad (4)$$

where ceil( ) is a function that rounds its argument up to the nearest integer.

Using the above in a simple example, suppose it is desired to represent M=340 different cell groups with unique combinations (pairings) of sequence values. The minimum number of sequences required in this instance is:

$$N_{Seq}=\mathrm{ceil}\left(\frac{1+\sqrt{1+8\cdot 340}}{2}\right)=\mathrm{ceil}\left(\frac{1+\sqrt{1+2720}}{2}\right)=27. \qquad (5)$$

A reason why it is desirable to minimize the number of sequences needed is to reduce the complexity of the processing required in the UE for detecting the cell group. FIGS. 2(*a*) and 2(*d*) illustrate a number of exemplary alternative ways of constructing the symbols $S_i$ ($1\leq i\leq 2$) from $S_i^{\%},S_j^{\%}$.

With reference to FIG. 2(*a*), a first exemplary embodiment involves transmitting, as the symbol $S_i$ associated with the particular cell group, the corresponding pair of sequences $S_i^{\%},S_j^{\%}$ ($i\neq j$), with the order of the pair (in either the time or frequency domains) indicating whether the transmitted symbol is $S_1$ or $S_2$. The length of each of $S_i^{\%}$ and $S_j^{\%}$ is, in this example, half the length of $S_i$. (In theory, $S_i^{\%}$ and $S_j^{\%}$ need not be of equal length, but in practice they are chosen to be so.) For example, a time domain embodiment would include transmitting as the secondary synchronization signals $S_1=S_i^{\%},S_j^{\%}$ (i.e., first transmitting $S_i^{\%}$ and then transmitting $S_j^{\%}$) and $S_2=S_j^{\%},S_i^{\%}$ (i.e., first transmitting $S_j^{\%}$ and then transmitting $S_i^{\%}$) in each radio frame.

Alternatively, frequency domain embodiments applying the principle illustrated in FIG. 2(*a*) transmit the sequences $S_i^{\%}$ and $S_j^{\%}$ simultaneously, with for example, transmission of the symbol $S_1$ being performed by transmitting the sequence $S_i^{\%}$ in a lower set of frequencies and the sequence $S_j^{\%}$ being transmitted in a higher set of frequencies. Transmission of the symbol $S_2$ is the opposite, with the sequence $S_j^{\%}$ being transmitted in the lower set of frequencies and the sequence $S_i^{\%}$ being transmitted in the higher set of frequencies. This arrangement is illustrated in FIG. 2(*b*).

In other frequency domain embodiments applying the principle illustrated in FIG. 2(*a*) the sequences $S_i^{\%}$ and $S_j^{\%}$ are transmitted simultaneously by means of interleaving. For example, given two sets of frequencies that are interleaved with one another, transmission of the symbol $S_1$ can be performed by transmitting the sequence $S_i^{\%}$ in a "lower" one of the sets of interleaved frequencies and transmitting the sequence $S_j^{\%}$ in a "higher" one of the sets of frequencies. (Here, the words "higher" and "lower" do not refer to the sets of frequencies as a single contiguous group, but rather to pairs of resource elements associated with the interleaved frequencies, so that one resource element associated with $S_i^{\%}$ is on a lower frequency than the neighboring resource element associated with $S_j^{\%}$.) Transmission of the symbol $S_2$ is the opposite, with the sequence $S_j^{\%}$ being transmitted in a lower one of the sets of frequencies and the sequence $S_i^{\%}$ being transmitted a higher one of the sets of frequencies. This arrangement is illustrated in FIG. 2(*c*).

In either case (i.e., time domain embodiment or frequency domain embodiment), the detector (UE) preferably includes a look-up table that associates each sequence pair and ordering with a cell group identifier and frame timing information (i.e., whether the ordering of the sequence pair indicates sub-frame 0 or sub-frame 5), so that the detector can easily identify the cell group and frame timing.

With reference to FIG. 2(*d*), another exemplary alternative embodiment involves generating each symbol $S_i$ as a weighted sum of the sequence pair $S_i^{\%}, S_j^{\%}$ ($i \neq j$), with each particular pairing being uniquely associated with one of the M cell groups. Furthermore, the amount of weighting applied to each of the sequences indicates whether the sequence pair is being transmitted in sub-frame 0 ($S_1$) or in sub-frame 5 ($S_2$). That is, the secondary synchronization symbols for each radio frame can be represented as follows:

$$S_1 = \alpha S_i^{\%} + \beta S_j^{\%} \text{ (for sub-frame 0)}$$

$$S_2 = \beta S_i^{\%} + \alpha S_j^{\%} \text{ (for sub-frame 5)} \tag{6}$$

In such embodiments, the length of each sequence $S_i^{\%}, S_j^{\%}$ can be the same as the length of the symbol $S_i$ and both sequences are transmitted at the same time. The different weightings ($\alpha$ and $\beta$, with $\alpha \neq \beta$) that indicate in which sub-frame the symbol is being transmitted can be achieved by transmitting the sequences at different amplitudes and/or powers relative to one another.

In this embodiment, the detector (UE) preferably includes a look-up table that associates each sequence pair and relative weighting of the sequences (e.g., as indicated by signal amplitude and/or power) with a cell group identifier and frame timing information (i.e., whether the applied multiplicands $\alpha$ and $\beta$ indicate sub-frame 0 or sub-frame 5), so that the detector can easily identify the cell group and frame timing. In alternative embodiments, a logic circuit associates each sequence pair and relative weighting of the sequences with a cell group identifier and frame timing information, so that the detector can easily identify the cell group and frame timing.

One possibility for constructing the multiplicands $\alpha$ and $\beta$ is to interpret them as diagonal matrices, that is:

$$\alpha = \begin{bmatrix} \alpha_1 & & & \\ & \alpha_2 & & \\ & & O & \\ & & & \alpha_N \end{bmatrix} \tag{7}$$

Hence, $S_1 = \alpha_i^{\%} + \beta S_j^{\%}$ can be interpreted as element-wise multiplication, that is:

$$S_{1,k} = \alpha_k S_{i,k}^{\%} + \beta_k S_{j,k}^{\%}, \tag{8}$$

wherein k is the kth element of the vector.

An alternative way to construct the multiplicands $\alpha$ and $\beta$ is to allow $\beta$ to be a function of the sequence in front of $\alpha$ in the formula for $S_1$, that is:

$$S_1 = \alpha S_i^{\%} + \beta(S_i^{\%}) S_j^{\%} \text{ (for sub-frame 0)}$$

$$S_2 = \beta(S_j^{\%}) S_i^{\%} + \alpha S_j^{\%} \text{ (for sub-frame 5).} \tag{9}$$

In this embodiment, the UE should first correlate to the sequence $S_i^{\%}$ and detect that one. Then, based on the detected $S_i$ sequence, the UE looks in, for example, a look-up table to determine the $\beta$ sequence, and then correlates and detects the $S_j^{\%}$ sequence.

Yet another alternative is similar to the one just described, but instead allows $\alpha$ to be a function of the sequence in front of $\beta$.

It will be appreciated that various embodiments can be implemented in OFDM as well as non-OFDM environments. In an OFDM system, for example, a first ordering of the pair of sequences, $S_i^{\%}, S_j^{\%}$ can be effected by transmitting the sequence $S_i^{\%}$ on a first set of one or more sub-carriers, and transmitting the sequence $S_j^{\%}$ on a second set of one or more sub-carriers. A second ordering of the pair of sequences, $S_i^{\%}, S_j^{\%}$ can be effected by transmitting the sequence $S_j^{\%}$ on the first set of one or more sub-carriers, and transmitting the sequence $S_i^{\%}$ (on the second set of one or more sub-carriers.

In a non-OFDM environment, the physical layer of the cellular communication system can still involve the symbols of the synchronization signal, $S_1$, being separated in a frequency domain. In such embodiments, the first ordering of the pair of sequences, $S_i^{\%}, S_j^{\%}$ can be effected by transmitting the sequence $S_i^{\%}$ on a first set of frequencies, and transmitting the sequence $S_j^{\%}$ on a second set of frequencies. The second ordering of the pair of sequences, $S_i^{\%}, S_j^{\%}$ can be effected by transmitting the sequence $S_j^{\%}$ on the first set of frequencies, and transmitting the sequence $S_i^{\%}$ on the second set of frequencies.

Figure 3:
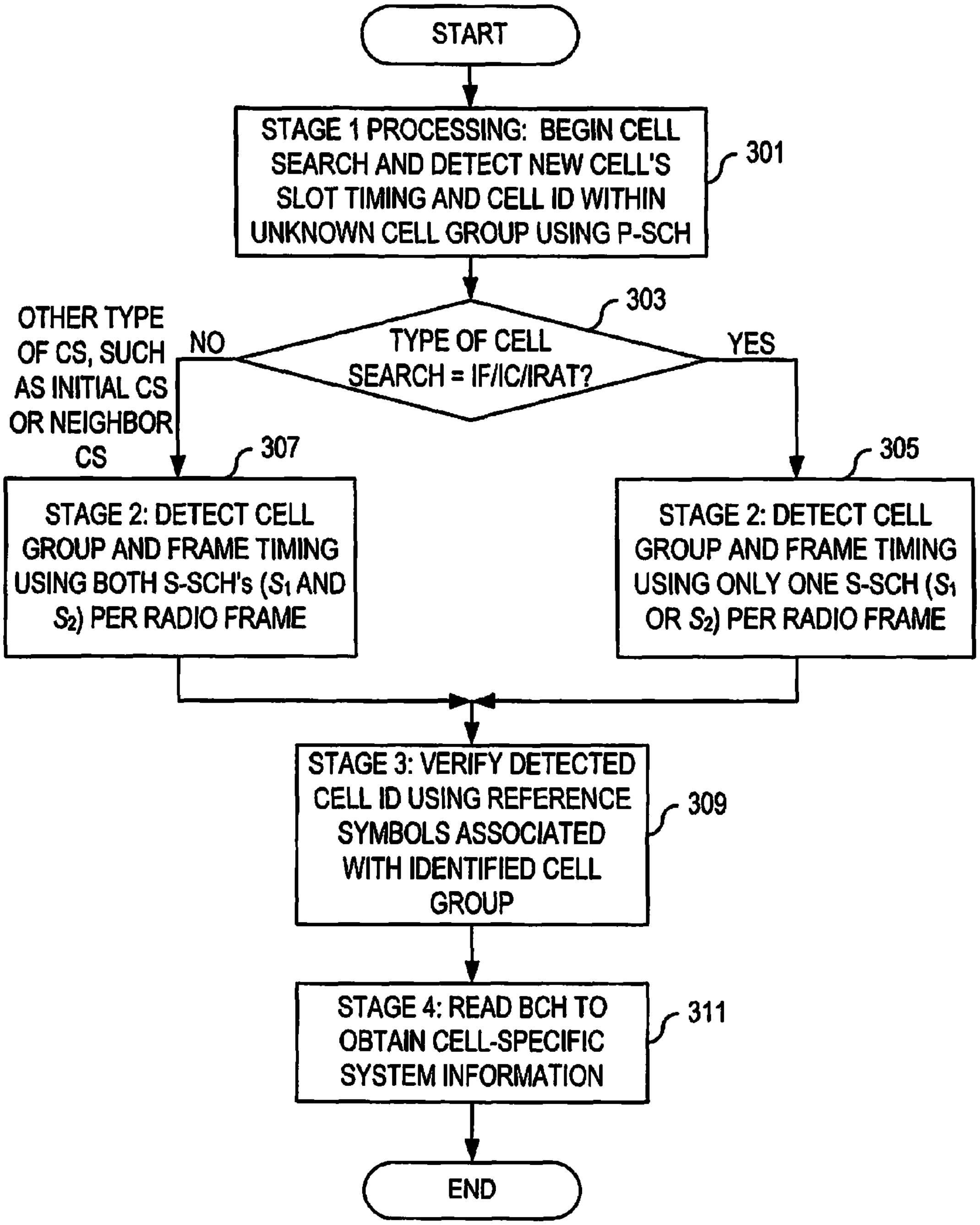
FIG. 3 is a flow chart of exemplary processes/steps performed by circuitry in a UE for utilizing the inventive secondary synchronization symbols to determine cell group and frame timing in accordance with other embodiments consistent with the invention.

FIG. 3 is a flow chart of exemplary processes/steps performed by circuitry in a UE (e.g., a detector) for utilizing the above-described secondary synchronization symbols to determine cell group and frame timing in accordance with embodiments consistent with the invention. The various blocks shown in FIG. 3 can also be considered to represent the UE's logic configured to perform the indicated function.

The UE begins by performing stage 1 processing, which includes beginning the cell search and detecting a newly found cell's slot timing (e.g., 5 ms timing) and cell ID within an unknown cell group using the P-SyS signals received on the P-SCH (step 301). Techniques for performing this step are well-known, and beyond the scope of the invention.

The UE is now ready to perform stage 2 processing. However, in accordance with an aspect of embodiments consistent with the invention, the type of cell search being performed will determine whether both $S_1$ and $S_2$ are used, or whether just one of these is used. More particularly, there are a number of different types of cell searches (e.g., initial cell search, neighbor cell search, inter-frequency cell search, and inter-radio access technology cell search), and each performs stage 2 processing to detect frame timing and to identify a cell's cell group. The cell search procedures are essentially the same for the different types, but there are some differences. For example, for an intra-frequency cell search the UE can perform cell searching simultaneously with data reception from the serving cell. However, for inter-frequency or inter-radio access technology cell searches (e.g., camping on a GSM system and performing cell search on an LTE system carrier) the UE must interrupt its data reception from the serving cell when changing carrier frequencies for the cell search. In order to reduce the interruption length (i.e., interruption in data reception), one wants to be able to detect all cell information in one synchronization frame. This eliminates the possibility of accumulating cell search information over a number of synchronization frames and therefore results in inter-frequency and inter-radio access technology cell searches having worse performance than intra-frequency cell searches. To accommodate this, networks are typically planned to tolerate slower cell searching for the inter-frequency and inter-radio access technology cell searching than for intra-frequency cell searching.

As to initial cell search procedures, the frequency error can be large. This creates a need to perform a frequency error correction step, typically between stages 1 and 2. Initial cell search performance is typically not as good as that of neighbor cell searching, but initial cell search is performed only when the UE is turned on, so it does not seriously affect the UE's overall performance.

Returning now to a discussion of FIG. 3, if it is determined that the type of cell search being performed is an inter-frequency ("IF"), inter-cell ("IC") or inter-radio access technology (IRAT) cell search ("YES" path out of decision block 303), stage 2 processing is invoked that uses only one S-SyS (either $S_1$ or $S_2$) per radio frame to detect cell group and frame timing (step 305). The sequence pair $S_i^{\%}, S_j^{\%}$ maximizing the correlation power is chosen as an indicator of the detected cell group. Depending on which embodiment is implemented, the specific order of the sequences or alternatively the power relation order of $S_i^{\%}, S_j^{\%}$ determines the frame timing (e.g., the 10 ms timing in an LTE system).

However, if it is determined that the type of cell search being performed is not an inter-frequency, inter-cell, or inter-radio access technology cell search ("NO" path out of decision block 303), this means that the UE is performing a cell search that requires a more accurate determination of frame timing and cell group, such as an initial cell search or a neighbor cell search. Consequently, stage 2 processing is invoked that uses both S-SySs (i.e., both $S_1$ and $S_2$) per radio frame to detect cell group and frame timing (step 307).

The results obtained from stage 2 processing (either step 305 or step 307) are then used in the usual way to facilitate stage 3 processing. In some embodiments, this can include verifying the cell ID obtained from earlier processing by using reference symbols associated with the identified cell group (step 309). That is, the reference symbols used for cell ID detection are descrambled using the scrambling code determined by the cell group and cell ID.

To complete the example, FIG. 3 also shows that stage 4 processing (i.e., reading the BCH to obtain cell-specific system information) is also performed. However, neither stage 3 nor stage 4 processing are an essential aspect of the invention, and are therefore not described here in great detail.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of indicating an identity of a particular cell group from a number, M, of possible cell groups in a cellular communication system, the method comprising:

identifying a first sequence and a second sequence from among a group of $N_{seq}$ different sequences, wherein a sequence pair comprising the first sequence and the second sequence is uniquely associated with one of M possible cell groups;

generating a first synchronization signal, the first synchronization signal comprising plural elements of the first sequence that are interleaved with plural elements of the second sequence according to a first ordering, alternating each of the plural elements of the first sequence with each of the plural elements of the second sequence, such that at least one element of the first sequence occurs before a corresponding element of the second sequence in the first synchronization signal;

transmitting, in a first time slot of a radio frame, the first synchronization signal;

generating a second synchronization signal, the second synchronization signal comprising plural elements of the first sequence that are interleaved with plural elements of the second sequence according to a second ordering, alternating each of the plural elements of the first sequence with each of the plural elements of the second sequence, such that at least one element of the second sequence occurs before a corresponding element of the first sequence in the second synchronization signal; and transmitting, in a second time slot of the radio frame, the second synchronization signal.

2. The method of claim 1, wherein the first synchronization signal and the second synchronization signal are each of length n, and each of the first sequence and the second sequence is of length n/2.

3. The method of claim 1, wherein:

a physical layer of the cellular communication system employs Orthogonal Frequency Division Multiplexing;

the first synchronization signal is interleaved such that the first sequence is transmitted on a first set of one or more sub-carriers, and the second sequence on a second set of one or more sub-carriers; and the second synchronization signal is interleaved such that the second sequence is transmitted on the first set of one or more sub-carriers, and the first sequence is transmitted on the second set of one or more sub-carriers.

4. The method of claim 1, wherein:

in a physical layer of the cellular communication system, symbols of the first synchronization signal are separated in a frequency domain;

the first ordering of interleaving is effected by transmitting the first sequence on a first set of frequencies, and transmitting the second sequence on a second set of frequencies; and the second ordering of interleaving is effected by transmitting the second sequence on the first set of frequencies, and transmitting the first sequence on the second set of frequencies.

5. The method of claim 1, wherein:

generating the first synchronization signal and the second synchronization signal comprises generating the first synchronization signal and the second synchronization signal in accordance with:

$$S_1=\alpha\tilde{S}_i+\beta\tilde{S}_j;\text{ and}$$

$$S_2=\beta\tilde{S}_i+\alpha\tilde{S}_j,$$

wherein:

$S_1$ is the first synchronization signal;

$S_2$ is the second synchronization signal;

$\tilde{S}_i$ is the first sequence;

$\tilde{S}_j$ is the second sequence;

α is a first multiplicand; and

β is a second multiplicand, α≠β.

6. The method of claim 5, wherein each of the multiplicands, α and β, is a scalar value and corresponds to an amount of signal amplitude.

7. The method of claim 5, wherein each of the multiplicands, α and β, is a scalar value and corresponds to an amount of signal power.

8. The method of claim 5, wherein the synchronization signals $S_1$ and $S_2$ and the sequences $\tilde{S}_i$ and $\tilde{S}_j$ are all of equal length.

9. The method of claim 5, wherein:

transmitting the synchronization signal $S_1$ comprises transmitting $\alpha\tilde{S}_i$, and $\beta\tilde{S}_j$ simultaneously; and transmitting the synchronization signal $S_2$ comprises transmitting $\beta\tilde{S}_i$ and $\alpha\tilde{S}_j$ simultaneously.

10. The method of claim 1, wherein use of the first ordering of interleaving only for transmission in the first time slot of the radio frame, and use of the second ordering of interleaving only for transmission in the second time slot enables detection of radio frame timing using just one of the first synchronization signal and the second synchronization signal.

11. The method of claim 1, wherein:

the first synchronization signal comprises elements of the first sequence $\tilde{S}_i$ that are scaled by at least a first multiplicand, α, and interleaved according to the first ordering with elements of the second sequence, $\tilde{S}_j$, that are scaled by at least a second multiplicand, β, wherein α≠β; and the second synchronization signal comprises elements of the first sequence, $\tilde{S}_i$ that are scaled by at least the second multiplicand, β, and interleaved according to the second ordering with elements of the second sequence, $\tilde{S}_j$, that are scaled by at least the first multiplicand, α.

12. A method of detecting an identity of a particular cell group from a number, M, of possible cell groups in a cellular communication system, the method comprising:

receiving a transmitted synchronization signal that comprises one of a first synchronization signal and a second synchronization signal, wherein:

the first synchronization signal comprises plural elements of a first sequence that are interleaved with plural elements of a second sequence according to a first ordering, alternating each of the plural elements of the first sequence with each of the plural elements of the second sequence, and the second synchronization signal comprises plural elements of a first sequence that are interleaved with plural elements of a second sequence according to a second ordering, alternating each of the plural elements of the first sequence with each of the plural elements of the second sequence;

identifying one of a plurality of predefined sequences best matches that corresponds to the first sequence in the transmitted synchronization signal;

identifying one of the predefined sequences that corresponds to the second sequence in the transmitted synchronization signal;

determining whether the pair of identified sequences in the transmitted synchronization signal were interleaved according to the first ordering or the second ordering;

identifying a cell group that is uniquely associated with the pair of sequences in the transmitted synchronization signal; and determining a time slot in which the transmitted synchronization signal was received based on whether at least one element of the first sequence occurs before a corresponding element of the second sequence in the transmitted synchronization signal.

13. The method of claim 12, wherein the first sequence and the second sequence are each of length n, and each of the first sequence and the second sequence is of length n/2.

14. The method of claim 12, wherein:

receiving the transmitted synchronization signal comprises receiving an Orthogonal Frequency Division Multiplexing signal;

determining a time slot in which the transmitted synchronization signal was received based on whether the sequences of the transmitted synchronization signal were interleaved according to the first ordering or the second ordering comprises at least one of:

determining whether the first sequence was received on a first set of one or more sub-carriers or a second set of one or more sub-carriers; and determining whether the second sequence was received on the first set of one or more sub-carriers or the second set of one or more sub-carriers.

15. The method of claim 14, wherein the first and second synchronization signals and the first and second sequences are all of equal length.

16. The method of claim 12, wherein:

in a physical layer of the cellular communication system, symbols of the transmitted synchronization signal are separated in a frequency domain;

the first ordering of interleaving causes the first sequence to be received on a first set of frequencies, and the second sequence to be received on a second set of frequencies; and the second ordering of interleaving causes the second sequence to be received on the first set of frequencies, and the first sequence to be received on the second set of frequencies.

17. The method of claim 12, wherein determining whether the first sequence and the second sequence were interleaved according to the first ordering or the second ordering comprises:

determining whether the transmitted synchronization signal represents:

$$S_1=\alpha\tilde{S}_i+\beta\tilde{S}_j;\text{ or}$$

$$S_2=\beta\tilde{S}_i+\alpha\tilde{S}_j,$$

wherein:

$S_1$ is the first synchronization signal;

$S_2$ is the second synchronization signal;

$\tilde{S}_i$ is the first sequence;

$\tilde{S}_j$ is the second sequence;

α is a first multiplicand; and

β is a second multiplicand, α≠β.

18. The method of claim 17, wherein each of the multiplicands, α and β, is a scalar value and corresponds to an amount of signal amplitude.

19. The method of claim 17, wherein each of the multiplicands, α and β, is a scalar value and corresponds to an amount of signal power.

20. The method of claim 17, wherein the first and second synchronization signals, $S_1$ and $S_2$, and the sequences $\tilde{S}_i$ and $\tilde{S}_j$ are all of equal length.

21. The method of claim 12, wherein receiving the transmitted synchronization signal comprises:

receiving the first sequence and the second sequence simultaneously.

22. The method of claim 12, wherein:

the first synchronization signal comprises elements of the first sequence $\tilde{S}_i$ that are scaled by at least a first multiplicand, α, and interleaved according to the first ordering with elements of the second sequence, $\tilde{S}_j$, that are scaled by at least a second multiplicand, β, wherein α≠β; and the second synchronization signal comprises elements of the first sequence, $\tilde{S}_i$ that are scaled by at least the second multiplicand, β, and interleaved according to the second ordering with elements of the second sequence, $\tilde{S}_j$, that are scaled by at least the first multiplicand, α.

23. The method of claim 12, wherein determining the time slot in which the transmitted synchronization signal was received comprises:

detecting radio frame timing based on which one of two time slots associated with a synchronization channel the transmitted synchronization signal was received in.

24. The method of claim 12, wherein identifying the cell group that is uniquely associated with the pair of sequences of the transmitted synchronization signal comprises using the first sequence and the second sequence of the transmitted synchronization signal to locate an entry in a look-up table.

25. The method of claim 12, wherein identifying the cell group that is uniquely associated with the pair of sequences of the transmitted synchronization signal is performed by calculation circuitry.

26. The method of claim 12, wherein determining the time slot in which the transmitted synchronization signal was received comprises using the first sequence and the second sequence of the transmitted synchronization signal to locate an entry in a look-up table.

27. The method of claim 12, wherein determining the time slot in which the transmitted synchronization signal was received is performed by calculation circuitry.

28. The method of claim 12, further comprising:

receiving a second transmitted synchronization signal wherein the second transmitted synchronization signal comprises an other one of the first and second synchronization signals;

determining whether a type of cell search procedure to be performed is an inter-frequency cell search procedure;

determining whether the type of cell search procedure to be performed is an inter-radio access technology cell search procedure;

determining whether the type of cell search procedure to be performed is an inter-cell cell search procedure; and if the type of cell search procedure to be performed is none of the inter-frequency cell search procedure, the inter-radio access technology cell search procedure, or the intra-cell search procedure, then performing:

identifying one of the plurality of predefined sequences that corresponds to a first sequence in the second transmitted synchronization signal;

identifying one of the predefined sequences that corresponds to a second sequence in the second transmitted synchronization signal; and determining whether the pair of identified sequences of the second transmitted synchronization signal were interleaved according to the first ordering or the second ordering; and identifying a cell group that is uniquely associated with the pair of identified sequences of the second transmitted synchronization signal.

29. An apparatus for indicating an identity of a particular cell group from a number, M, of possible cell groups in a signal transmitted in a cellular communication system, the apparatus comprising:

electronic circuitry, coupled to a memory and a processor, configured to:

identify a first sequence and a second sequence from among a group of $N_{seq}$ different sequences, wherein a sequence pair comprising the first sequence and the second sequence is uniquely associated with one of M possible cell groups;

generate a first synchronization signal, the first synchronization signal comprising plural elements of the first sequence that are interleaved with plural elements of the second sequence according to a first ordering, alternating each of the plural elements of the first sequence with each of the plural elements of the second sequence, such that at least one element of the first sequence occurs before a corresponding element of the second sequence in the first synchronization signal;

transmit, in a first time slot of a radio frame, the first synchronization signal;

generate a second synchronization signal, the second synchronization signal comprising plural elements of the first sequence that are interleaved with plural elements of the second sequence according to a second ordering, alternating each of the plural elements of the first sequence with each of the plural elements of the second sequence, such that at least one element of the second sequence occurs before a corresponding element of the first sequence in the second synchronization signal; and transmit, in a second time slot of the radio frame, the second synchronization signal.

30. The apparatus of claim 29, wherein the first synchronization signal and the second synchronization signal are each of length n, and each of the first sequence and the second sequence is of length n/2.

31. The apparatus of claim 29, wherein:

a physical layer of the cellular communication system employs Orthogonal Frequency Division Multiplexing;

the electronic circuitry is configured to:

generate the first synchronization signal that comprises elements of the first sequence that are interleaved with elements of the second sequence according to the first ordering by transmitting the first sequence on a first set of one or more sub-carriers, and transmitting the second sequence on a second set of one or more sub-carriers; and generate the second synchronization signal that comprises elements of the first sequence that are interleaved with elements of the second sequence according to the second ordering by transmitting the second sequence on the first set of one or more sub-carriers, and transmitting the first sequence on the second set of one or more sub-carriers.

32. The apparatus of claim 31, wherein the first and second synchronization signals and the first and second sequences are all of equal length.

33. The apparatus of claim 29, wherein:

in a physical layer of the cellular communication system, symbols of the first synchronization signal are separated in a frequency domain;

the electronic circuitry is configured to generate the first synchronization signal comprising elements of the first sequence that are interleaved with elements of the second sequence according to the first ordering by transmitting the first sequence on a first set of frequencies, and transmitting the second sequence on a second set of frequencies; and the electronic circuitry is configured to generate the second synchronization signal comprising elements of the first sequence that are interleaved with elements of the second sequence according to the second ordering by transmitting the second sequence on the first set of frequencies, and transmitting the first sequence on the second set of frequencies.

34. The apparatus of claim 29, wherein the electronic circuitry is configured to:

generate the first synchronization signal and the second synchronization signal in accordance with:

$S_1=\alpha\tilde{S}_i+\beta\tilde{S}_j$; and $S_2=\beta\tilde{S}_i+\alpha\tilde{S}_j$, wherein:

$S_1$ is the first synchronization signal;

$S_2$ is the second synchronization signal;

$\tilde{S}_i$ is the first sequence;

$\tilde{S}_j$ is the second sequence;

$\alpha$ is a first multiplicand; and $\beta$ is a second multiplicand, $\alpha\neq\beta$.

35. The apparatus of claim 34, wherein each of the multiplicands, $\alpha$ and $\beta$, is a scalar value and corresponds to an amount of signal amplitude.

36. The apparatus of claim 34, wherein each of the multiplicands, $\alpha$ and $\beta$, is a scalar value and corresponds to an amount of signal power.

37. The apparatus of claim 34, wherein the synchronization signals $S_1$ and $S_2$ and the sequences $\tilde{S}_i$ and $\tilde{S}_j$ are all of equal length.

38. The apparatus of claim 34, wherein the electronic circuitry is configured to:

transmit the synchronization signal $S_1$ by transmitting $\alpha\tilde{S}_i$ and $\beta\tilde{S}_j$ simultaneously; and transmit the synchronization signal $S_2$ by transmitting $\beta\tilde{S}_i$ and $\alpha\tilde{S}_j$ simultaneously.

39. The apparatus of claim 29, wherein use of the first ordering of interleaving only for transmission in the first time slot and use of the second ordering of interleaving only for transmission in the second time slot enables detection of radio frame timing using just one of the first synchronization signal and the second synchronization signal.

40. The apparatus of claim 29, wherein:

the first synchronization signal comprises elements of the first sequence $\tilde{S}_i$ that are scaled by at least a first multiplicand, $\alpha$, and interleaved according to the first ordering with elements of the second sequence, $\tilde{S}_j$, that are scaled by at least a second multiplicand, $\beta$, wherein $\alpha\neq\beta$; and the second synchronization signal comprises elements of the first sequence, $\tilde{S}_i$ that are scaled by at least the second multiplicand, $\beta$, and interleaved according to the second ordering with elements of the second sequence, $\tilde{S}_j$, that are scaled by at least the first multiplicand, $\alpha$.

41. An apparatus for detecting an identity of a particular cell group from a number, M, of possible cell groups in a cellular communication system, the apparatus comprising:

electronic circuitry, coupled to a memory and a processor, configured to:

receive a transmitted synchronization signal that comprises one of a first synchronization signal and a second synchronization signal, wherein:

the first synchronization signal comprises plural elements of a first sequence that are interleaved with plural elements of a second sequence according to a first ordering, alternating each of the plural elements of the first sequence with each of the plural elements of the second sequence; and the second synchronization signal comprises plural elements of the first sequence that are interleaved with plural elements of the second sequence according to a second ordering, alternating each of the plural elements of the first sequence with each of the plural elements of the second sequence;

identify one of a plurality of predefined sequences that corresponds to the first sequence of the transmitted synchronization signal;

identify one of the predefined sequences that corresponds to the second sequence of the transmitted synchronization signal;

determine whether the pair of identified sequences of the transmitted synchronization signal were interleaved according to the first ordering or the second ordering;

identify a cell group that is uniquely associated with the pair of identified sequences of the transmitted synchronization signal; and determine a time slot the transmitted synchronization signal was received based on whether at least one element of the first sequence occurs before a corresponding element of the second sequence in the transmitted synchronization signal.

42. The apparatus of claim 41, wherein the first synchronization signal and the second synchronization signal are each of length n, and each of the first sequence and the second sequence is of length n/2.

43. The apparatus of claim 41, wherein the electronic circuitry is configured to:

receive the transmitted synchronization signal by receiving an Orthogonal Frequency Division Multiplexing signal;

determine a time slot in which the transmitted synchronization signal was received based on whether the first sequence and the second sequence were interleaved according to the first ordering or the second ordering by performing at least one of:

determining whether the first sequence was received on a first set of one or more sub-carriers or a second set of one or more sub-carriers; and determining whether the second sequence was received on the first set of one or more sub-carriers or the second set of one or more sub-carriers.

44. The apparatus of claim 43, wherein the first and second synchronization signals and the first and second sequences are all of equal length.

45. The apparatus of claim 41, wherein:

in a physical layer of the cellular communication system, symbols of the transmitted synchronization signal are separated in a frequency domain;

the first ordering of interleaving causes the first sequence to be received on a first set of frequencies, and the second sequence to be received on a second set of frequencies; and the second ordering of interleaving causes the second sequence to be received on the first set of frequencies, and the first sequence to be received on the second set of frequencies.

46. The apparatus of claim 41, wherein the electronic circuitry is configured to determine whether the first sequence and the second sequence were interleaved according to the first ordering or the second ordering by:

determining whether the transmitted synchronization signal represents:

$$S_1=\alpha\tilde{S}_i+\beta\tilde{S}_j;\text{ or}$$

$$S_2=\beta\tilde{S}_i+\alpha\tilde{S}_j,$$

wherein:

$S_1$ is the first synchronization signal;

$S_2$ is the second synchronization signal;

$\tilde{S}_i$ is the first sequence;

$\tilde{S}_j$ is the second sequence;

$\alpha$ is a first multiplicand; and $\beta$ is a second multiplicand, $\alpha\neq\beta$.

47. The apparatus of claim 46, wherein each of the multiplicands, $\alpha$ and $\beta$, is a scalar value and corresponds to an amount of signal amplitude.

48. The apparatus of claim 46, wherein each of the multiplicands, $\alpha$ and $\beta$, is a scalar value and corresponds to an amount of signal power.

49. The apparatus of claim 46, wherein the first and second synchronization signals, $S_1$ and $S_2$, and the sequences $\tilde{S}_i$ and $\tilde{S}_j$ are all of equal length.

50. The apparatus of claim 41, wherein the electronic circuitry is configured to receive the transmitted synchronization signal by:

receiving the first sequence and the second sequence simultaneously.

51. The apparatus of claim 41, wherein the electronic circuitry is further configured to determine the time slot in which the transmitted synchronization signal was received by:

detecting radio frame timing based on which one of two time slots associated with the synchronization channel the transmitted synchronization signal was received in.

52. The apparatus of claim 41, wherein the electronic circuitry is configured to identify the cell group that is uniquely associated with the first sequence and the second sequence by using the first sequence and the second sequence to locate an entry in a look-up table.

53. The apparatus of claim 41, wherein the electronic circuitry configured to identify the cell group that is uniquely associated with the pair of sequences of the transmitted synchronization signal comprises calculation circuitry.

54. The apparatus of claim 41, wherein the electronic circuitry is configured to determine the time slot in which the transmitted synchronization signal was received by using the pair of identified sequences to locate an entry in the look-up table.

55. The apparatus of claim 41, wherein the electronic circuitry configured to determine the time slot in which the transmitted synchronization signal was received comprises:

calculation circuitry that takes as input the pair of identified sequences.

56. The apparatus of claim 41, wherein the electronic circuitry is further configured to:

receive a second transmitted synchronization signal, wherein the second synchronization signal comprises an other one of the first and second synchronization signals;

determine whether a type of cell search procedure to be performed is an inter-frequency cell search procedure;

determine whether the type of cell search procedure to be performed is an inter-radio access technology cell search procedure;

determine whether the type of cell search procedure to be performed is an inter-cell cell search procedure;

respond to the type of cell search procedure to be performed being none of the inter-frequency cell search procedure, the inter-radio access technology cell search procedure, or the intra-cell search procedure, by performing:

identifying one of the plurality of predefined sequences that corresponds to a first sequence of the second transmitted synchronization signal;

identifying one of the predefined sequences that corresponds to a second sequence of the second transmitted synchronization signal; and determining whether the pair of identified sequences of the second transmitted synchronization signal were interleaved according to the first ordering or the second ordering; and identifying a cell group that is uniquely associated with the pair of identified sequences of the second transmitted synchronization signal.

57. The apparatus of claim 41, wherein:

the first synchronization signal comprises elements of the first sequence $\tilde{S}_i$ that are scaled by at least a first multiplicand, $\alpha$, and interleaved according to the first ordering with elements of the second sequence, $\tilde{S}_j$, that are scaled by at least a second multiplicand, $\beta$, wherein $\alpha\neq\beta$; and the second synchronization signal comprises elements of the first sequence, $\tilde{S}_i$ that are scaled by at least the second multiplicand, $\beta$, and interleaved according to the second ordering with elements of the second sequence, $\tilde{S}_j$, that are scaled by at least the first multiplicand, $\alpha$.

* * * * *

CERTIFICATE OF CORRECTION

PATENT NO. : 9,094,146 B2
APPLICATION NO. : 13/159017
DATED : July 28, 2015
INVENTOR(S) : Lindoff et al.

It is certified that error appears in the above-identified patent and that said Letters Patent is hereby corrected as shown below:

On the Title Page, in item (57), under "ABSTRACT", in Column 2, Line 7, delete "$S_i^{\%}, S_j^{\%} (S_i^{\%} \neq S_j^{\%}$" insert -- $\tilde{S}_i, \tilde{S}_j (\tilde{S}_i \neq \tilde{S}_j)$ --, therefor.

On the Title Page, in item (57), under "ABSTRACT", in Column 2, Line 9, delete "$S_i^{\%}, S_j^{\%}$" and insert -- $\tilde{S}_i, \tilde{S}_j$ --, therefor.

In the Specification

In Column 2, Line 42, delete "$S_i^{\%}, S_j^{\%}$" and insert -- $\tilde{S}_i, \tilde{S}_j$ --, therefor.

In Column 2, Line 44, delete "$S_2$" and insert -- $S_2$, --, therefor.

In Column 2, Line 45, delete "$S_i^{\%}, S_j^{\%}$" and insert -- $\tilde{S}_i, \tilde{S}_j$ --, therefor.

In Column 2, Line 47, delete "$S_i^{\%}, S_j^{\%}$," and insert -- $\tilde{S}_i, \tilde{S}_j$, --, therefor.

In Column 2, Line 58, delete "$S_i^{\%} \neq S_j^{\%}$." and insert -- $\tilde{S}_i \neq \tilde{S}_j$. --, therefor.

In Column 2, Line 67, delete "$S_i^{\%}, S_j^{\%}$" and insert -- $\tilde{S}_i, \tilde{S}_j$ --, therefor.

In Column 3, Line 1, delete "$S_i^{\%}$ before transmitting the sequence $S_j^{\%}$;" and insert -- $\tilde{S}_i$ before transmitting the sequence $\tilde{S}_j$; --, therefor.

Signed and Sealed this
Twelfth Day of April, 2016

Michelle K. Lee
*Director of the United States Patent and Trademark Office*

In Column 3, Line 2, delete "$S_i^{\%}, S_j^{\%}$" and insert -- $\tilde{S}_i, \tilde{S}_j$ --, therefor.

In Column 3, Line 3, delete "$S_j^{\%}$" and insert -- $\tilde{S}_j$ --, therefor.

In Column 3, Line 4, delete "$S_i^{\%}$." and insert -- $\tilde{S}_i$ --, therefor.

In Column 3, Line 5, delete "$S_i^{\%}, S_j^{\%}$" and insert -- $\tilde{S}_i, \tilde{S}_j$ --, therefor.

In Column 3, Line 9, delete "$S_i^{\%}, S_j^{\%}$" and insert -- $\tilde{S}_i, \tilde{S}_j$ --, therefor.

In Column 3, Line 10, delete "$S_i^{\%}$" and insert -- $\tilde{S}_i$ --, therefor.

In Column 3, Line 11, delete "$S_j^{\%}$" and insert -- $\tilde{S}_j$ --, therefor In Column 3, Line 13, delete "$S_i^{\%}, S_j^{\%}$ is effected by transmitting the sequence $S_j^{\%}$" and insert -- $\tilde{S}_i, \tilde{S}_j$ is effected by transmitting the sequence $\tilde{S}_j$ --, therefor.

In Column 3, Line 15, delete "$S_i^{\%}$" and insert -- $\tilde{S}_i$ --, therefor.

In Column 3, Line 19-21, delete "$S_1 = \alpha S_i^{\%} + \beta S_j^{\%}$; and $S_2 = \beta S_i^{\%} - \alpha S_j^{\%}$, "

and insert -- $S_1 = \alpha\tilde{S}_i + \beta\tilde{S}_j$; and $S_2 = \beta\tilde{S}_i + \alpha\tilde{S}_j$, --, therefor.

In Column 3, Line 30, delete "$S_i^{\%}$ and $S_j^{\%}$" and insert -- $\tilde{S}_i$ and $\tilde{S}_j$ --, therefor.

In Column 3, Line 33, delete "$\alpha S_i^{\%}$" and insert -- $\alpha\tilde{S}_i$ --, therefor.

In Column 3, Line 34, delete "$\beta S_j^{\%}$" and insert -- $\beta\tilde{S}_j$ --, therefor.

In Column 3, Line 35, delete "$\beta S_i^{\%}$ and $\alpha S_j^{\%}$" and insert -- $\beta\tilde{S}_i$ and $\alpha\tilde{S}_j$ --, therefor.

In Column 3, Lines 48-49, delete “$S_i^{\%},S_j^{\%}$” and insert -- $\tilde{S}_i, \tilde{S}_j$ --, therefor.

In Column 3, Line 50, delete “$S_i^{\%},S_j^{\%}$” and insert -- $\tilde{S}_i, \tilde{S}_j$ --, therefor.

In Column 3, Line 53, delete “$S_i^{\%}$,” and insert -- $\tilde{S}_i$, --, therefor.

In Column 3, Line 54, delete “$S_j^{\%}$,” and insert -- $\tilde{S}_j$, --, therefor.

In Column 3, Line 55, delete “$S_i^{\%},S_j^{\%}$” and insert -- $\tilde{S}_i, \tilde{S}_j$ --, therefor.

In Column 4, Line 1, delete “$S_i^{\%},S_j^{\%}$,” and insert -- $\tilde{S}_i, \tilde{S}_j$, --, therefor.

In Column 4, Line 6, delete “$S_i^{\%},S_j^{\%}$” and insert -- $\tilde{S}_i, \tilde{S}_j$ --, therefor.

In Column 4, Line 10, delete “$S_i^{\%},S_j^{\%}$” and insert -- $\tilde{S}_i, \tilde{S}_j$ --, therefor.

In Column 4, Line 11, delete “$S_i^{\%},S_j^{\%}$” and insert -- $\tilde{S}_i, \tilde{S}_j$ --, therefor.

In Column 4, Line 13, delete “$S_i^{\%},S_j^{\%}$” and insert -- $\tilde{S}_i, \tilde{S}_j$ --, therefor.

In Column 4, Line 18, delete “$S_i^{\%},S_j^{\%}$” and insert -- $\tilde{S}_i, \tilde{S}_j$ --, therefor.

In Column 4, Line 30, delete “$S_i^{\%}$” and insert -- $\tilde{S}_i$ --, therefor.

In Column 4, Line 32, delete “$S_j^{\%}$” and insert -- $\tilde{S}_j$ --, therefor.

In Column 4, Line 34, delete “$S_i^{\%},S_j^{\%}$” and insert -- $\tilde{S}_i, \tilde{S}_j$ --, therefor.

In Column 4, Line 39, delete “$S_i^{\%},S_j^{\%}$,” and insert -- $\tilde{S}_i, \tilde{S}_j$ --, therefor.

In Column 4, Line 51, delete “$S_i^{\%},S_j^{\%}$” and insert -- $\tilde{S}_i, \tilde{S}_j$ --, therefor.

In Column 5, Line 45, delete "$S_i^{\%}$,$S_j^{\%}$." and insert -- $\tilde{S}_i,\tilde{S}_j$. --, therefor.

In Column 5, Line 51, delete "$S_1=f_1(S_1^{\%},S_2^{\%})$ and $S_2=f_2(S_1^{\%},S_2^{\%})$." and insert -- $S_1 = f_1(\tilde{S}_1,\tilde{S}_2)$ and $S_2 = f_2(\tilde{S}_1,\tilde{S}_2)$. --, therefor.

In Column 6, Line 37, delete "$S_i^{\%}$,$S_j^{\%}$." and insert -- $\tilde{S}_i,\tilde{S}_j$. --, therefor.

In Column 6, Line 41, delete "$S_i^{\%}$,$S_j^{\%}$ (i≠j)," and insert -- $\tilde{S}_i,\tilde{S}_j$ $(i \neq j)$, --, therefor.

In Column 6, Line 43, delete "$S_i^{\%}$ and $S_j^{\%}$" and insert -- $\tilde{S}_i$ and $\tilde{S}_j$ --, therefor.

In Column 6, Line 44, delete "$S_i^{\%}$ and $S_j^{\%}$" and insert -- $\tilde{S}_i$ and $\tilde{S}_j$ --, therefor.

In Column 6, Line 48, delete "$S_1=S_i^{\%}$,$S_j^{\%}$" (i.e., first transmitting $S_i^{\%}$" and insert -- $S_1 = \tilde{S}_i,\tilde{S}_j$ (i.e., first transmitting $\tilde{S}_i$ --, therefor.

In Column 6, Line 49, delete "$S_j^{\%}$) and $S_2=S_j^{\%}$,$S_i^{\%}$" (i.e., first transmitting $S_j^{\%}$" and insert -- $S_2 = \tilde{S}_j,\tilde{S}_i$ (i.e., first transmitting $\tilde{S}_j$ --, therefor.

In Column 6, Line 50, delete "$S_i^{\%}$)" and insert -- $\tilde{S}_i$) --, therefor.

In Column 6, Line 53, delete "$S_i^{\%}$ and $S_j^{\%}$" and insert -- $\tilde{S}_i$ and $\tilde{S}_j$ --, therefor.

In Column 6, Line 55, delete "$S_i^{\%}$" and insert -- $\tilde{S}_i$ --, therefor.

In Column 6, Line 56, delete "$S_j^{\%}$" and insert -- $\tilde{S}_j$ --, therefor.

In Column 6, Line 58, delete "$S_j^{\%}$" and insert -- $\tilde{S}_j$ --, therefor.

In Column 6, Line 59, delete "$S_i^{\%}$" and insert -- $\tilde{S}_i$ --, therefor.

In Column 6, Line 62, delete "$S_i^{\%}$ and $S_j^{\%}$" and insert -- $\tilde{S}_i$ and $\tilde{S}_j$ --, therefor.

In Column 6, Line 66, delete “$S_i^{\%}$” and insert -- $\tilde{S}_i$ --, therefor.

In Column 7, Line 1, delete “$S_j^{\%}$” and insert -- $\tilde{S}_j$ --, therefor.

In Column 7, Line 5, delete “$S_i^{\%}$” and insert -- $\tilde{S}_i$ --, therefor.

In Column 7, Line 7, delete “$S_j^{\%}$.)” and insert -- $\tilde{S}_j$.) --, therefor.

In Column 7, Line 8, delete “$S_j^{\%}$” and insert -- $\tilde{S}_j$ --, therefor.

In Column 7, Line 9, delete “$S_i^{\%}$” and insert -- $\tilde{S}_i$ --, therefor.

In Column 7, Line 22, delete “$S_i^{\%}$,$S_j^{\%}$ ($i \neq j$),” and insert -- $\tilde{S}_i, \tilde{S}_j$ ($i \neq j$), --, therefor.

In Column 7, Line 30-32, delete “

$$S_1 - \alpha S_i^{\%} + \beta S_j^{\%} \quad \text{(for sub-frame 0)}$$

$$S_2 = \beta S_i^{\%} + \alpha S_j^{\%} \quad \text{(for sub-frame 5)}$$

” and insert --

$$S_1 = \alpha \tilde{S}_i + \beta \tilde{S}_j \quad \text{(for sub-frame 0)}$$

$$S_2 = \beta \tilde{S}_i + \alpha \tilde{S}_j \quad \text{(for sub-frame 5)}$$

--, therefor.

In Column 7, Line 34, delete “$S_i^{\%}$,$S_j^{\%}$” and insert -- $\tilde{S}_i, \tilde{S}_j$ --, therefor.

In Column 7, Line 63, delete “$S_1 = \alpha S_i^{\%} + \beta S_j^{\%}$” and insert -- $S_1 = \alpha \tilde{S}_i + \beta \tilde{S}_j$ --, therefor.

In Column 7, Line 66, delete “$S_{1,k} = \alpha_k S_{i,k}^{\%} + \beta_k S_{j,k}^{\%}$,” and insert -- $S_{1,k} = \alpha_k \tilde{S}_{i,k} + \beta_k \tilde{S}_{j,k}$, --, therefor.

In Column 8, Line 5-7, delete “

$$S_1 = \alpha S_i^{\%} + \beta(S_i^{\%}) S_j^{\%} \quad \text{(for sub-frame 0)}$$

$$S_2 = \beta(S_j^{\%}) S_i^{\%} + \alpha S_j^{\%} \quad \text{(for sub-frame 5).}$$

” and insert --

$$S_1 = \alpha \tilde{S}_i + \beta\left(\tilde{S}_i\right) \tilde{S}_j \quad \text{(for sub-frame 0)}$$

$$S_2 = \beta\left(\tilde{S}_j\right) \tilde{S}_i + \alpha \tilde{S}_j \quad \text{(for sub-frame 5).}$$

--, therefor.

In Column 8, Line 9, delete “$S_i^{\%}$” and insert -- $\tilde{S}_i$ --, therefor.

In Column 8, Line 12, delete “$S_j^{\%}$” and insert -- $\tilde{S}_j$ --, therefor.

In Column 8, Line 19, delete “$S_i^{\%}$,$S_j^{\%}$” and insert -- $\tilde{S}_i, \tilde{S}_j$ --, therefor.

In Column 8, Line 20, delete “$S_i^{\%}$” and insert -- $\tilde{S}_i$ --, therefor.

In Column 8, Line 21, delete “$S_j^{\%}$” and insert -- $\tilde{S}_j$ --, therefor.

In Column 8, Line 23, delete “$S_i^{\%}$,$S_j^{\%}$ can be effected by transmitting the sequence $S_j^{\%}$” and insert -- $\tilde{S}_i, \tilde{S}_j$ can be effected by transmitting the sequence $\tilde{S}_j$ --, therefor.

In Column 8, Line 25, delete “$S_i^{\%}$ (on” insert -- $\tilde{S}_j$ on --, therefor.

In Column 8, Line 30, delete “$S_i^{\%}$,$S_j^{\%}$” and insert -- $\tilde{S}_i, \tilde{S}_j$ --, therefor.

In Column 8, Line 31, delete “$S_i^{\%}$” and insert -- $\tilde{S}_i$ --, therefor.

In Column 8, Line 32, delete “$S_j^{\%}$” and insert -- $\tilde{S}_j$ --, therefor.

In Column 8, Line 33, delete “$S_i^{\%}$,$S_j^{\%}$” and insert -- $\tilde{S}_i, \tilde{S}_j$ --, therefor.

In Column 8, Line 34, delete “$S_j^{\%}$” and insert -- $\tilde{S}_j$ --, therefor.

In Column 8, Line 35, delete “$S_i^{\%}$” and insert -- $\tilde{S}_i$ --, therefor.

In Column 9, Line 25, delete “$S_i^{\%}$,$S_j^{\%}$” and insert -- $\tilde{S}_i, \tilde{S}_j$ --, therefor.

In Column 9, Line 29, delete “$S_i^{\%}$,$S_j^{\%}$” and insert -- $\tilde{S}_i, \tilde{S}_j$ --, therefor.